United States Patent
Hulls et al.

[11] Patent Number: 5,802,779
[45] Date of Patent: Sep. 8, 1998

[54] VERMIN CONTROL METHOD

[75] Inventors: Byron Hulls, Reynoldsburg; Kathy D. Schmidt, Utica, both of Ohio

[73] Assignee: Owens Corning Fiberglas Technology, Inc., Summit, Ill.

[21] Appl. No.: 851,760

[22] Filed: May 6, 1997

Related U.S. Application Data

[62] Division of Ser. No. 635,997, Apr. 22, 1996, Pat. No. 5,678,362.

[51] Int. Cl.$^6$ ................................ A01K 3/00; E04B 1/72; E04H 9/16
[52] U.S. Cl. ................................ 52/101; 52/292.3; 43/124
[58] Field of Search .................................. 52/101, 293.3; 43/124, 132.1

[56] References Cited

U.S. PATENT DOCUMENTS

| | | |
|---|---|---|
| 2,087,164 | 7/1937 | Purifoy . |
| 2,112,229 | 3/1938 | Davis . |
| 2,126,664 | 4/1938 | Reis . |
| 2,138,182 | 11/1938 | Lipthrott . |
| 2,139,225 | 12/1938 | Easling . |
| 2,150,891 | 3/1939 | Tennison . |
| 2,176,598 | 10/1939 | Tennison et al. . |
| 2,242,266 | 5/1941 | Scales . |
| 2,315,989 | 4/1943 | Tennison . |
| 2,347,776 | 5/1944 | Gunn . |
| 2,352,338 | 6/1944 | Muirhead . |
| 2,674,765 | 4/1954 | Tennison . |
| 2,720,051 | 10/1955 | Line . |
| 2,842,892 | 12/1958 | Aldridge et al. . |
| 2,859,487 | 11/1958 | Tonnon et al. . |
| 2,915,848 | 12/1959 | Griffin . |
| 3,089,282 | 5/1963 | Tennison . |

(List continued on next page.)

FOREIGN PATENT DOCUMENTS 0071279   9/1986   European Pat. Off. .

OTHER PUBLICATIONS

Franco Rama, Giovanni Meazza, Franco Bettarini; "Synthesis and Bioactivity of Some Flourine–Containing Benzoyl Arylureas Part II: Insecticidal Products in Which The Aryl Group Bears a Polyfluroralkoxy or (Polyfluoroalkoxy) Alkoxy Side Chain" Jan. 13, 1992; Pestic. Sci. 1992.

"Radiosysthesis of [benzoyl–3.4.5–3H] Diflubenzuron by a Route Applicable to Other High–Potency Insect Growth Regulators" Berthane Telce, Luis O. Ruzo, John E. Casida; J. Agrie, Food Chem. 1988; Feb. 2, 1987.

Évaluation of Bait–Toxicants for Suppression of Subterraneean Termite Populations; Nan–Yao Su; Sociobiology, vol. 19, No. 1, 1991.

(List continued on next page.)

*Primary Examiner*—Crieghton Smith
*Assistant Examiner*—W. Glenn Edwards
*Attorney, Agent, or Firm*—C. Michael Gegenheimer; Curtis B. Brueske

[57] ABSTRACT

A termite shield according to the present invention provides a physical barrier between a foundation and a wooden building structure, a detection mechanism for detecting termite presence, and a chemical termiticide in the form of a bait block. The termite shield includes a sill plate barrier which is positioned between a masonry foundation and a sill of a wooden structure. An interior bait block holder is removably attached to the sill plate barrier on an interior side of the foundation, and an exterior bait block holder is removably attached to the sill plate barrier at an exterior side of the foundation. The bait block holders may be provided with a block of wood which is inspected periodically to detect the activity of termites. If termites are detected, the block of wood may be replaced with a bait block of cellulosic material containing termiticide. The termite control device addresses the disadvantages of the prior art at least by combining the benefits of a physical termite barrier with the use of chemical termiticides to control termites.

10 Claims, 2 Drawing Sheets

5,802,779
Page 2

U.S. PATENT DOCUMENTS

| | | |
|---|---|---|
| 3,209,485 | 10/1965 | Griffin . |
| 3,285,810 | 11/1966 | Hart . |
| 3,857,934 | 12/1974 | Bernstein et al. . |
| 4,363,798 | 12/1982 | D'Orazio . |
| 4,455,441 | 6/1984 | Prestwich . |
| 4,468,405 | 8/1984 | Rigterink et al. . |
| 4,536,341 | 8/1985 | Rigterink et al. . |
| 4,625,474 | 12/1986 | Peacock, deceased et al. . |
| 4,823,520 | 4/1989 | Ebeling et al. . |
| 5,007,197 | 4/1991 | Barbett . |
| 5,024,832 | 6/1991 | Omata et al. . |
| 5,094,028 | 3/1992 | Hume . |
| 5,094,045 | 3/1992 | Tamashiro . |
| 5,097,641 | 3/1992 | Hand et al. . |
| 5,151,443 | 9/1992 | Henrick et al. . |
| 5,159,778 | 11/1992 | Metzner et al. . |
| 5,303,502 | 4/1994 | Metzner et al. . |
| 5,303,523 | 4/1994 | Hand et al. . |
| 5,329,726 | 7/1994 | Thorne et al. . |
| 5,347,749 | 9/1994 | Chitwood et al. . |
| 5,359,806 | 11/1994 | Jeffrey et al. . |
| 5,378,086 | 1/1995 | Campbell, Jr. et al. . |
| 5,417,017 | 5/1995 | Toutountzis . |
| 5,464,613 | 11/1995 | Barcay et al. . |
| 5,480,638 | 1/1996 | Erwin . |

OTHER PUBLICATIONS

Nan–Yao Su and Rudolf H. Scheffrahn; "laboratory Evaluation of Two Chitin Synthesis Inhibitors, Hexaflumuron and Diflubenzuron, as Bait Toxicants Against Formosan and Eastern Subterranean Termites (Isoptera: Rhinotermitidae)"; Nov. 24, 1992; Journal of Economic Entomology.

Nan–Yao Su; "Field Evalution of a Hexaflumuron Bait for Population Suppression of Subterranean Termites (Isoptera; Rhinotermitida"; Jan. 7, 1993; Journal of Economic Entomology.

VERMIN CONTROL METHOD

CROSS-REFERENCE TO RELATED APPLICATION(S)

This is a division of U.S. Pat. application Ser. No. 08/635,997, filed Apr. 22, 1996, now U.S. Pat. No. 5,678,362.

FIELD OF THE INVENTION

The present invention relates to an active barrier for preventing vermin, such as termites and other crawling insects from entering buildings, and more particularly, the invention relates to a physical vermin barrier which incorporates material providing an indication of vermin activity or a chemical termiticide.

DESCRIPTION OF THE RELATED ART

Termite damage to wood constructions is a well known problem in certain geographic areas having high termite populations. Building codes in these high termite areas require some method of termite control. One known method of termite control includes blocking routes of termite entry from the soil to the wood of a building structure. However, since termites can pass through cracks as narrow as 1 mm or smaller, complete termite blocking is difficult. Termite barriers which are used to block the route of entry of termites include barriers such as those disclosed in U.S. Pat. Nos. 5,303,523, 5,097,641, and 2,150,891. These termite barriers generally include a termite seal which is placed between a masonry foundation and a wooden sill plate of the structure. These barriers may be formed from metal sheets which are inserted between a foundation and a wooden sill of a building structure and prevent termites from entering the structure. The barriers generally include a flange which extends away from the building and is bent downward at an angle to prevent the termites from building mud tunnels along the foundation from the soil to the wood of the building.

These physical barriers are not a completely effective method of termite control because termites can bypass the barrier undetected through small cracks or around anchor bolts to reach the building structure. Another problem with standard termite barriers is that they are often covered by siding or the like for aesthetic reasons. This permits the termites an opportunity to go around the barrier undetected until damage to the building is extensive.

Another commonly used method of termite control is the use of a chemical soil treatments or termiticides which are applied to the soil surrounding the foundation and provide a chemical barrier to termites. This chemical treatment must be applied thoroughly and uniformly to block all routes of termite entry. However, some of the termiticides which have been used in the past to control termites, such as Chlordane and Heptachlor, have now been suspended by the Environmental Protection Agency. The safer alternative termiticides which are used today, such as Dursban, are effective for a shorter time period than the old termiticides and may lose their effectiveness and require reapplication in as few as five years. These chemical treatments provide a barrier to termites but do not reduce the termite pressure on a structure.

Therefore, there is a need for a longer term termite control system which provides not only a physical barrier that prevents termites from entering a structure but also provides a means of detection and/or a bait toxicant which reduces the termite population.

SUMMARY OF THE INVENTION

The device according to the present invention addresses the disadvantages of the prior art by combining the benefits of a physical termite barrier with the use of chemical termiticides to control termites. Even if termites are able to bypass the physical barrier, they can be detected and controlled by the chemical termiticides. The physical barrier is easily installed in new construction between the foundation and the wooden building structure and includes a detachable termiticide supply which is easily replaced.

According to one aspect of the present invention, a termite control device includes a barrier member configured to be received between a building foundation and a building structure, a first holder removably attached to the barrier at a first side of the building foundation, and a first piece of material removably received in the first holder member, the first piece of material providing an indication of termite activity or including a termiticide.

According to another aspect of the present invention, a termite control device includes, a barrier member for sealing a space between a building foundation and a building structure, first holder means for removably attaching a first piece of cellulosic material to the barrier member, the first piece of cellulosic material extending along a first surface of the building foundation, and second holder means for removably attaching a second piece of cellulosic material to the barrier member, second piece of cellulosic material extending along a second surface of the building foundation opposing the first holder means.

According to another aspect of the present invention a method of termite control includes steps of: providing a barrier between a building foundation and a building structure; attaching a piece of cellulosic material to the barrier at an interior and an exterior of the foundation; inspecting the cellulosic material to detect the presence of termites; and replacing the cellulosic material with a cellulosic material containing termiticide if termites are detected.

BRIEF DESCRIPTION OF THE DRAWING FIGURES

The invention will be described in greater detail with reference to the accompanying drawings in which like elements bear like reference numerals, and wherein.

DETAILED DESCRIPTION

Figure 1:
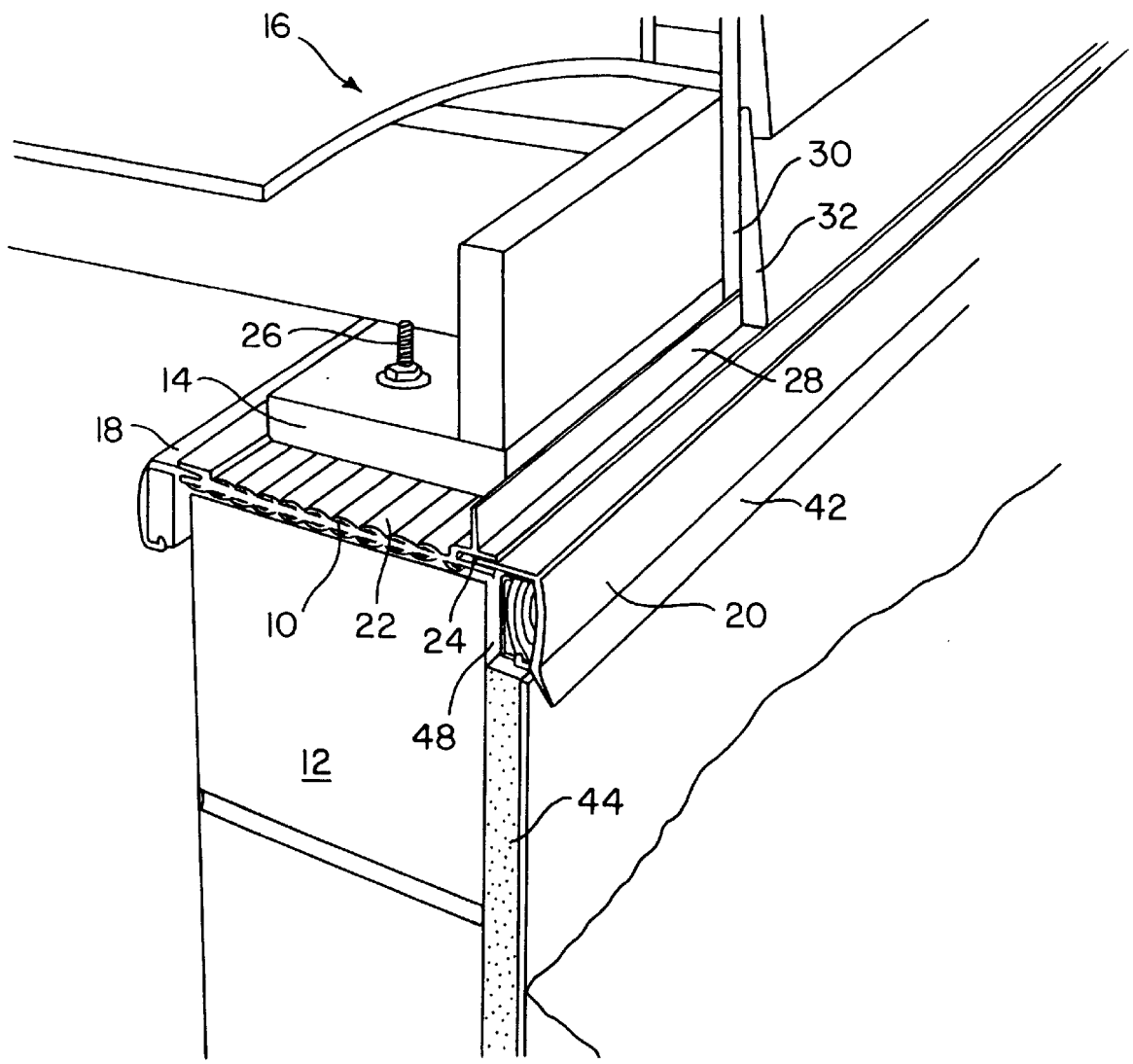
FIG. 1 is partially cut away perspective view of an installed termite control device according to the present invention.

The termite shield according to the present invention provides a physical barrier between a masonry, concrete or other type of foundation and a wooden building structure, a detection mechanism for detecting termite presence, and a chemical termiticide in the form of a bait block. The termite shield includes a sill plate barrier 10 which is positioned between a masonry foundation 12 and a sill 14 of a wooden structure 16. An interior bait block holder 18 is removably attached to the sill plate barrier 10 on an interior side of the foundation 12, and an exterior bait block holder 20 is removably attached to the sill plate barrier 10 at an exterior side of the foundation.

The sill plate barrier 10 includes a plurality of flexible fins 22 which provide a seal between the foundation 12 and the sill 14. The flexible fins 22 have a tapered shape and extend along the length of the barrier 10. The barrier 10 also includes two receiving channels or grooves 24 which extend along either edge of the barrier for receiving the bait block holders 18, 20. The barrier 10 is placed between the foundation 12 and the sill 14 during construction. The sill 14 is then bolted to the foundation 12 by anchor bolts 26 which cause the sill 14 to compress the flexible fins 22 of the barrier 10. The compression of the fins 22 creates a seal between the foundation 12 and the sill 14 which blocks air exchange, moisture, and termites. Preferably, the holes in the sill 14 and the barrier 10 for the anchor bolts 26 are surrounded with caulking (not shown) to provide an improved seal.

The portion of the barrier 10 on the exterior side of the foundation may also be provided with a siding counterflashing 28 which extends upward from the barrier portion having the groove 24. The siding counterflashing 28 is designed to be positioned between an exterior wall 30 of the structure 16 and the siding 32 and directs any water which drips from the siding away from the foundation.

The bait block holders 18, 20 are snapped into the barrier 10 and may be used to hold either a regular block of wood or a bait block 40 containing a termiticide or other poison. The regular block of wood is used to detect termites by periodic inspection of the wood to determine if termites are present. When termites are detected in the regular wood block, the wood block is then replaced with a bait block containing termiticide. This reduces the use of termiticide generally insofar as it is used when and where necessary rather than a general application at the time of construction.

Figure 2:
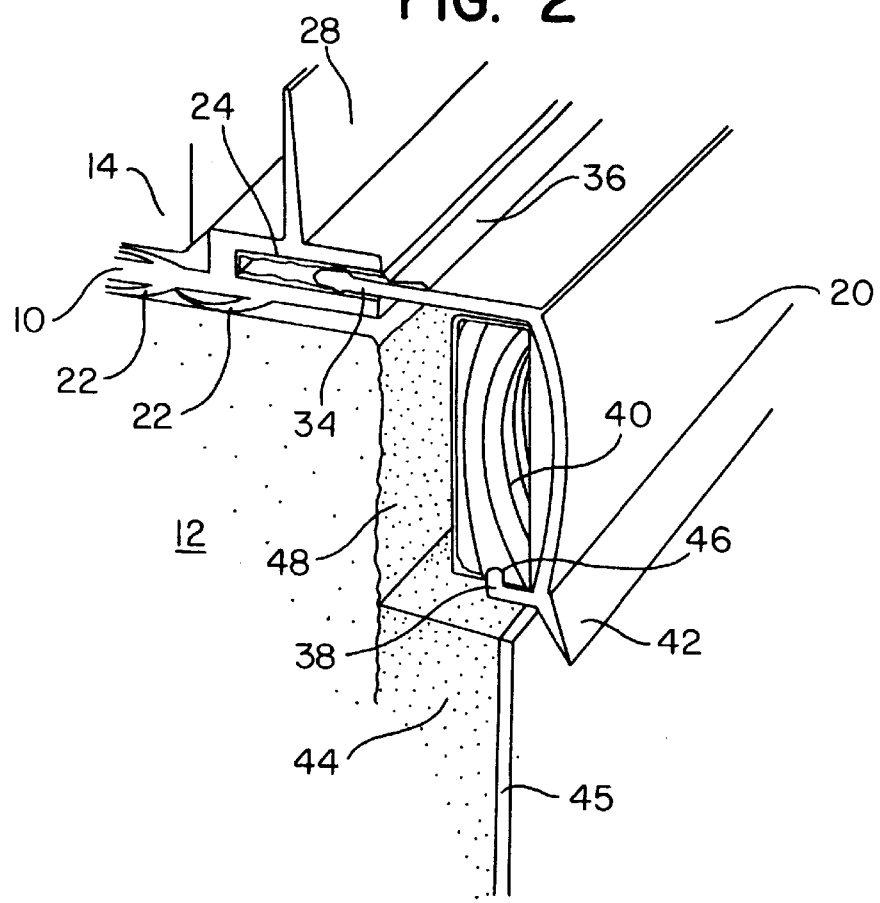
FIG. 2 is an enlarged perspective view of the portion of the device of FIG. 1 which is at the exterior of a building structure.

As shown most clearly in FIG. 2, the bait block holders 18, 20 are generally J-shaped in cross section and include an extension 34 having a plurality of ridges 36. The extensions 34 of the holders 18, 20 are received in the grooves 24 in the barrier 10 with a friction fit. The grooves 24 in the barrier 10 may be provided with corresponding ridges to improve the snap fit connection between the barrier and the holder. At an opposite end, the holders 18, 20 include a flange 38 which holds the block of wood or bait block 40 in place. The exterior bait block holder 20 includes an additional drip edge 42 which extends from the bottom edge of the holder at an angle of between 5° and 75° from the vertical. The drip edge 42 directs water away from the foundation 12 and away from a foundation insulating layer 44 which is often used over the exterior surface of the foundation. The termite control system may be used with foam insulation 44 with or without a covering finished layer 45. Thus, the exterior bait block holder 20 also serves as decorative trim for the transition between siding 32 and foundation 12 or insulating layer 44. As such, various shapes and colors may be adopted for the exposed surfaces.

The bait blocks 40 or the pieces of wood which are received in the holders 18, 20 are configured to fit in the holders and include a groove 46 at a central portion of a bottom edge for receiving the flange 38. The bait block 40 or piece of wood may be easily replaced by removing the holder 18, 20 from the structure and replacing the block with a new block which may be done periodically. The flange can either fit into a groove 46 in the wood or bait block 40 as shown or in a rabbit at the edge of the block 40.

The holder 18, 20 is made of a flexible material so that the block 40 can be snapped in place without fasteners. For instance, the bait block holders 18, 20, and the barrier 10 are preferably formed of a resilient material such as an extruded flexible PVC plastic. The material of at least the exterior bait block holder 20 is preferably UV protected.

The exterior bait block holder 20 fits in a two inch inspection port 48 which is an area of exposed, uninsulated, above ground foundation. The two inch inspection port 48 is a possible requirement of building codes in many high termite pressure areas for allowing inspection of the foundation for the appearance of termite tunnels along the foundation. The holder 20 may be easily removed to perform the inspection of the port 48 and then replaced.

Figure 3:
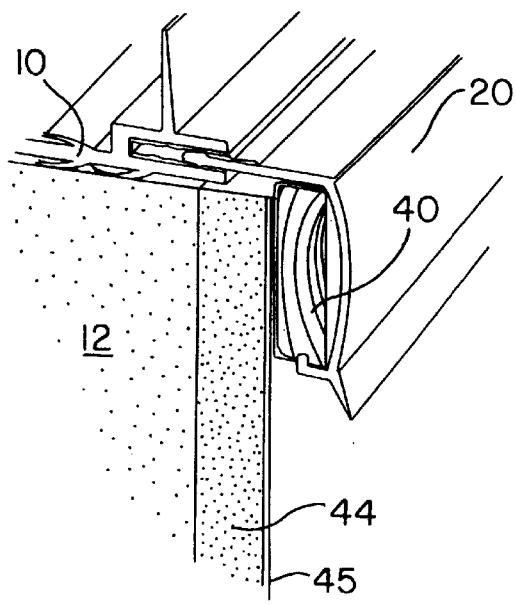
FIG. 3 is a perspective view of an alternative embodiment of the invention.

The exterior bait block 20 may also be positioned at the outside of the exterior foundation insulation 44, as illustrated in FIG. 3. This allows greater energy efficiency and can be used in areas where an inspection gap is not required by building code.

The bait block holder 20 preferably holds the bait block 40 or the piece of wood adjacent the foundation 12 so that a termite which travels up the foundation between the foundation and the insulation 44 encounters the wood or bait block. The barrier 10 acts as a primary barrier for termite entry and will route the termites away from the foundation and into contact with the bait block 40 or wood block. The bait block 40 or the wood block may be formed of a non-structural cellulosic material. The barrier 10 extends across the entire top surface of the foundation 12 and makes it difficult for termites to enter from the inside, the outside, or the interior of the masonry foundation.

The bait block 40 for use in the present invention is preferably formed from a cellulose based material such as wood chips, wood pulp, sawdust, or recycled newspaper which is treated with an acetone solution of termiticide and then dry pressed into a desired shape. One such termiticide treated product is described in European Patent No. 0,071, 279. The preferred termiticides for use in the bait block are also described in the European Patent and preferably have zero mammalian toxicity. The termiticide treated bait block may also be formed of other materials such as foam or a tape of starch, agar, etc. The termites which ingest some of the termiticide treated cellulosic material of the bait block 40 then take the termiticide back to their nest where it is ingested by other termites.

The termite control device according to the present invention provides a physical barrier to both moisture and termites. The barrier directs the termites to a block of wood or a bait block which may easily be inspected for termite activity and replaced when necessary. Although the termite control device according to the present invention is primarily useful in new construction, the bait block holders may also be retrofit to existing termite barriers or connected to a foundation in the absence of a termite barrier. The system is useful even in situations where the termites cannot be effectively blocked as an indicator of their activity and as a termiticide bait holder.

While the invention has been described in detail with reference to a preferred embodiment thereof, it will be apparent to one skilled in the art that various changes can be made, and equivalents employed without departing from the spirit and scope of the invention.

We claim:
1. A method of vermin control comprising:
   providing a barrier between a building foundation and a building structure;
   attaching a piece of cellulosic material to the barrier at an interior surface and an exterior surface of the foundation;
   inspecting the cellulosic material to detect the presence of vermin; and replacing the cellulosic material with a cellulosic material containing poison if vermin are detected.

2. The method of vermin control according to claim 1, further comprising periodically replacing the cellulosic material containing poison.

3. The method of vermin control according to claim 1, wherein the cellulosic material is inspected or replaced by removing a holder from the barrier member, inspecting or replacing the cellulosic material and reconnecting the holder to the barrier member.

4. The method of vermin control according to claim 1, further comprising forming the cellulosic material containing poison by treating cellulosic pieces with a poison and pressing the treated cellulosic pieces into a compacted elongated strip.

5. The method of vermin control according to claim 1, further comprising detaching the cellulosic material from the barrier at the exterior surface of the foundation, and inspecting the foundation beneath the cellulosic material at an inspection port.

6. A method of vermin control comprising:

providing a barrier between a building foundation and a building structure;

attaching a piece of material for indicating vermin activity to the barrier at a side of the foundation;

inspecting the material to detect the presence of vermin; and replacing the material with a material containing poison if vermin are detected.

7. The method of vermin control according to claim 6, further comprising periodically replacing the material containing poison.

8. The method of vermin control according to claim 6, wherein the material is inspected or replaced by removing a holder from the barrier member, inspecting or replacing the material and reconnecting the holder to the barrier member.

9. The method of vermin control according to claim 6, further comprising forming the material containing poison by treating pieces of the material with a poison and pressing the treated pieces into a compacted elongated strip.

10. The method of vermin control according to claim 6, further comprising detaching the material from the barrier at the side of the foundation, and inspecting the foundation beneath the material at an inspection port.

* * * * *